United States Patent
Sasanka

(10) Patent No.: US 9,424,042 B2
(45) Date of Patent: Aug. 23, 2016

(54) SYSTEM, APPARATUS AND METHOD FOR TRANSLATING VECTOR INSTRUCTIONS

(75) Inventor: Ruchira Sasanka, Hilboro, OR (US)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 13/993,603

(22) PCT Filed: Dec. 6, 2011

(86) PCT No.: PCT/US2011/063434
§ 371 (c)(1),
(2), (4) Date: Jun. 12, 2013

(87) PCT Pub. No.: WO2013/085491
PCT Pub. Date: Jun. 13, 2013

(65) Prior Publication Data
US 2013/0283022 A1    Oct. 24, 2013

(51) Int. Cl.
    *G06F 9/30*    (2006.01)
(52) U.S. Cl.
    CPC ......... *G06F 9/30181* (2013.01); *G06F 9/3001* (2013.01); *G06F 9/3017* (2013.01); *G06F 9/30018* (2013.01); *G06F 9/30036* (2013.01); *G06F 9/30076* (2013.01); *G06F 9/30174* (2013.01)
(58) Field of Classification Search
    None
    See application file for complete search history.

(56) References Cited

U.S. PATENT DOCUMENTS

| | | | | |
|---|---|---|---|---|
| 4,128,880 A | * | 12/1978 | Cray, Jr. ............ | G06F 15/8084 711/100 |
| 5,313,614 A | * | 5/1994 | Goettelmann ............ | G06F 8/52 717/138 |
| 5,530,881 A | * | 6/1996 | Inagami .............. | G06F 9/30036 712/222 |
| 5,680,338 A | * | 10/1997 | Agarwal ................. | G06F 17/16 708/520 |
| 5,802,384 A | * | 9/1998 | Nakamura .......... | G06F 15/8084 712/4 |

(Continued)

OTHER PUBLICATIONS

PCT International Search Report for PCT Counterpart Application No. PCT/US2011/063434, 3 pgs., (Jun. 20, 2012).

(Continued)

*Primary Examiner* — Eric Coleman
(74) *Attorney, Agent, or Firm* — Nicholson De Vos Webster & Elliott LLP

(57) ABSTRACT

Vector translation instructions are used to demarcate the beginning and the end of a code region to be translated. The code region includes a first set of vector instructions defined in an instruction set of a source processor. A processor receives the vector translation instructions and the demarcated code region, and translates the code region into translated code. The translated code includes a second set of vector instructions defined in an instruction set of a target processor. The translated code is executed by the target processor to produce a result value, the result value being the same as an original result value produced by the source processor executing the code region. The target processor stores the result value at a location that is not a vector register, the location being the same as an original location used by the source processor to store the original result value.

18 Claims, 12 Drawing Sheets

(56) References Cited

U.S. PATENT DOCUMENTS

| | | | | |
|---|---|---|---|---|
| 6,009,261 | A * | 12/1999 | Scalzi | G06F 9/45504 703/26 |
| 6,366,998 | B1 * | 4/2002 | Mohamed | G06F 9/30036 712/17 |
| 6,807,622 | B1 * | 10/2004 | McGrath | G06F 9/30101 712/210 |
| 7,428,630 | B2 | 9/2008 | Topham | |
| 7,873,812 | B1 * | 1/2011 | Mimar | G06T 1/20 712/2 |
| 8,495,602 | B2 | 7/2013 | Chen et al. | |
| 2008/0229298 | A1 * | 9/2008 | O'Brien | G06F 8/456 717/160 |
| 2009/0100247 | A1 * | 4/2009 | Moyer | G06F 9/30032 712/4 |
| 2010/0293534 | A1 | 11/2010 | Andrade et al. | |
| 2011/0145543 | A1 | 6/2011 | Damron | |

OTHER PUBLICATIONS

PCT Written Opinion of the International Searching Authority for PCT Counterpart Application No. PCT/US2011/063434, 4 pgs., (Jun. 20, 2012).

PCT Notification concerning Transmittal of International Preliminary Report on Patentability (Chapter I of the Patent Cooperation Treaty) for PCT Counterpart Application No. PCT/US2011/063434, 6 pgs., (Jun. 19, 2014).

* cited by examiner

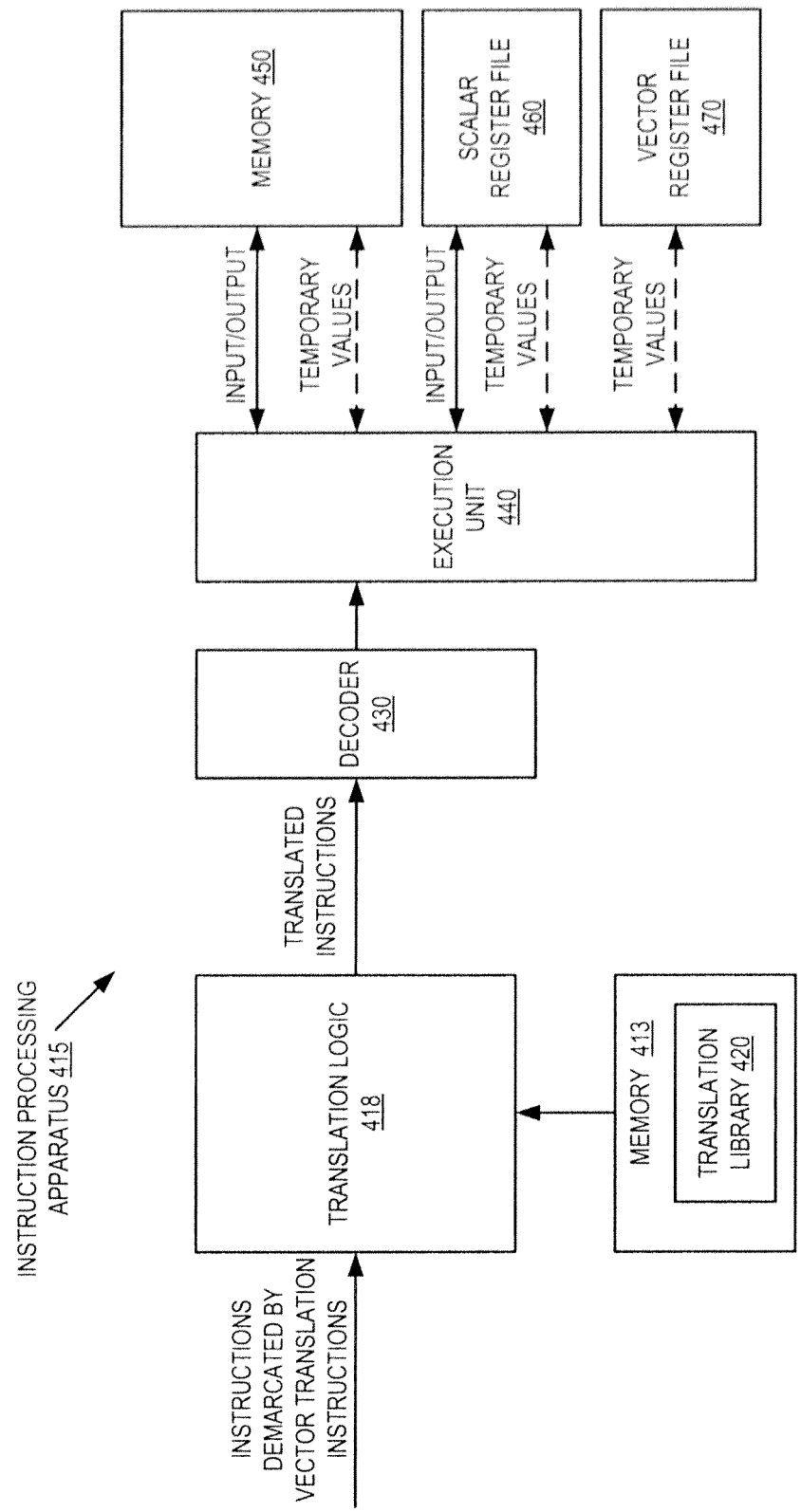

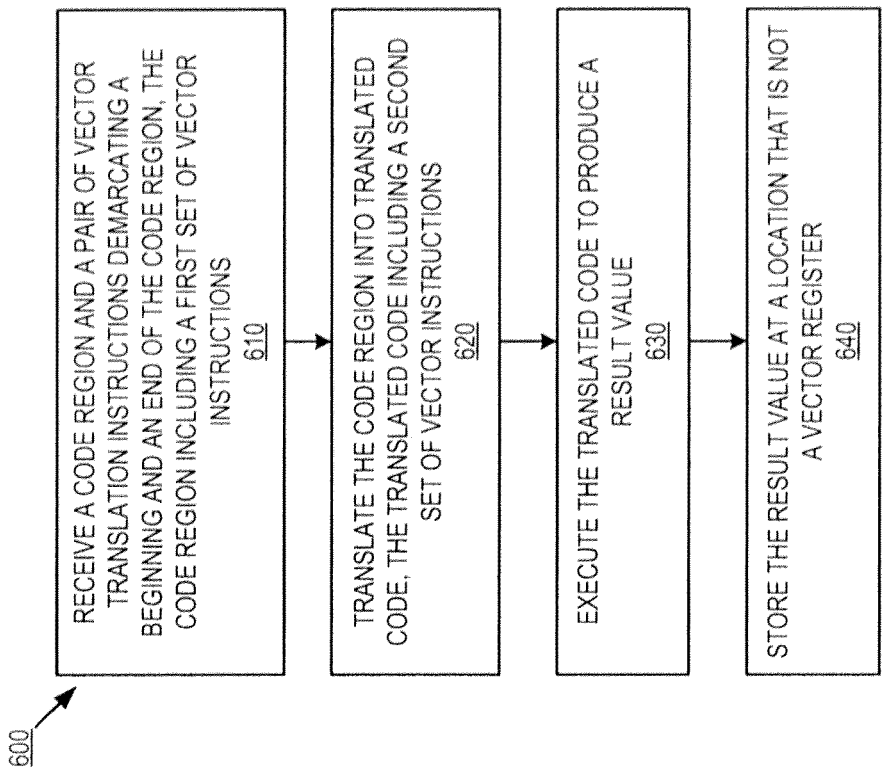

SYSTEM, APPARATUS AND METHOD FOR TRANSLATING VECTOR INSTRUCTIONS

CROSS-REFERENCE TO RELATED APPLICATION

This patent application is a U.S. National Phase Application under 35 U.S.C. §371 of International Application No. PCT/US2011/063434, filed Dec. 6, 2011, entitled SYSTEM, APPARATUS AND METHOD FOR TRANSLATING VECTOR INSTRUCTIONS.

FIELD OF THE INVENTION

Embodiments of the invention relate generally to computer processor architecture, and, more specifically, to instructions which when executed cause a particular result.

DESCRIPTION OF THE RELATED ART

Many processors have Single Instruction, Multiple Data (SIMD) architectures. The SIMD architectures generally help to significantly improve processing speed. In SIMD architectures, instead of a scalar instruction operating on only one data element or pair of data elements, a vector instruction (also referred to as packed data instruction or SIMD instruction) may operate on multiple data elements or multiple pairs of data elements simultaneously or in parallel. The processor may have parallel execution hardware responsive to the vector instruction to perform the multiple operations simultaneously or in parallel.

In SIMD architectures multiple data elements may be packed within one register or memory location as packed data or vector data. In vector data, the bits of the register or other storage location may be logically divided into a sequence of multiple fixed-sized data elements. Each of the data elements may represent an individual piece of data that is stored in the register or storage location along with other data elements typically having the same size. For example, a 256-bit wide register may have four 64-bit wide vector elements, eight 32-bit wide vector elements, sixteen 16-bit wide vector elements, or thirty-two 8-bit wide vector elements. Each of the vector elements may represent a separate individual piece of data (e.g., a color of a pixel, etc.) that may be operated upon separately or independently of the others.

Representatively, a vector add instruction may specify that a single vector operation (e.g., addition) be performed on all corresponding pairs of data elements from two source vector operands to generate a destination or result vector. The source vector operands may be of the same size, may contain data elements of the same width, and thus may each contain the same number of data elements. The source data elements in the same bit positions in the two source vector operands may represent pairs of corresponding data elements. The vector operation may be performed separately or independently on each of these pairs of corresponding source data elements to generate a matching number of result data elements, and thus each pair of corresponding source data elements may have a corresponding result data element. Typically, the result data elements for such an instruction are in the same order and they often have the same size.

Different processor families may support different sets of vector instructions. The different sets of vector instructions may have different vector widths, different formats, and perform different operations when executed. As a consequence, a programmer writing vector code for one processor may have to manually re-write the code for another processor. Re-writing the code can be time consuming and error prone.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 3A-3C illustrate example embodiments of vector translation instructions and operations thereof.

FIG. 4 is a block diagram of an example embodiment of an instruction processing apparatus having an execution unit that is operable to execute instructions including an example embodiment of vector translation instructions.

FIG. 5 is a block diagram of an article of manufacture (e.g., a computer program product) including a tangible, non-transitory machine-accessible and/or machine-readable storage medium storing vector translation instructions.

FIG. 6 is flow diagrams illustrating example embodiments of methods for processing vector translation instructions.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
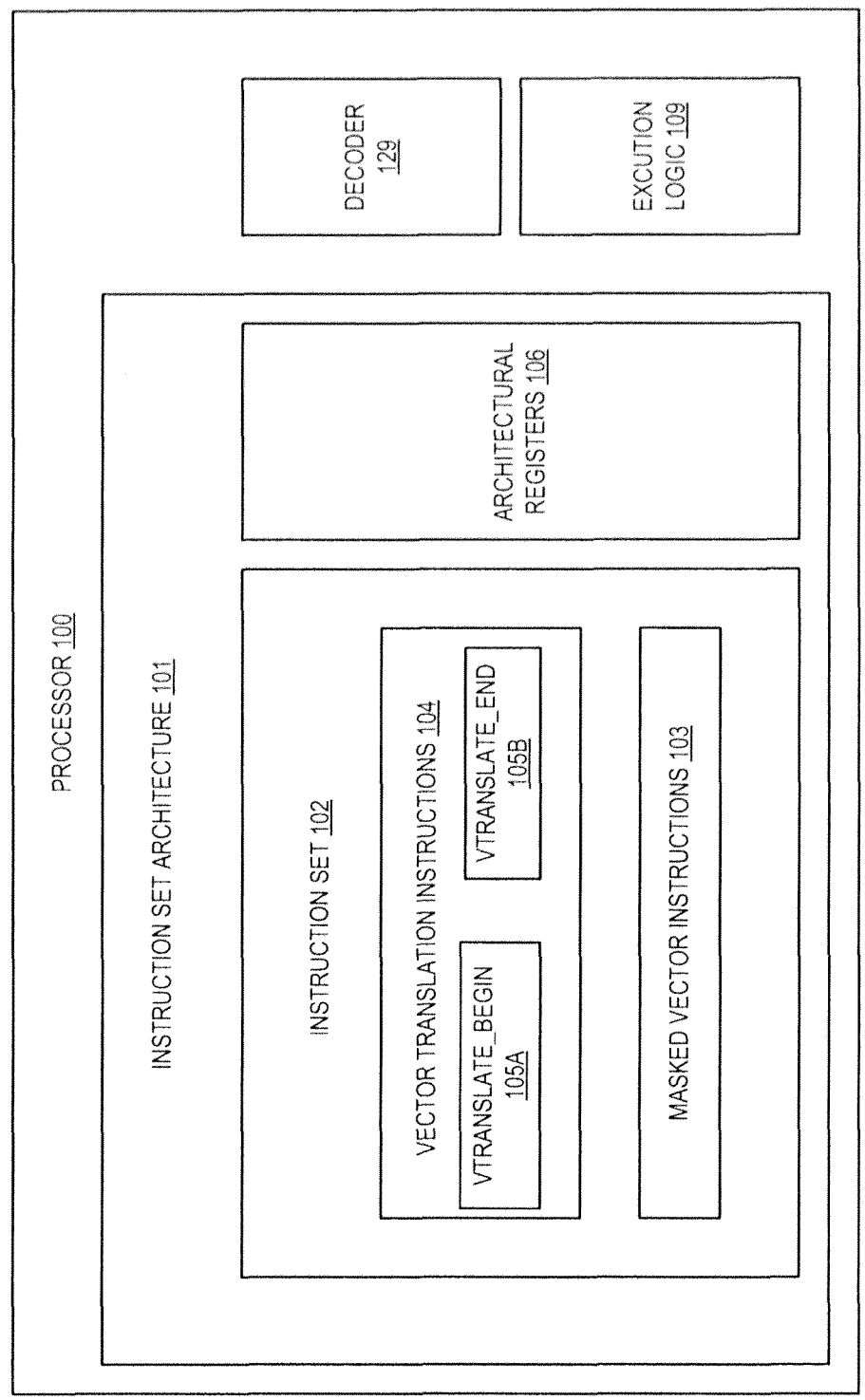
FIG. 1 is a block diagram of an example embodiment of a processor having an instruction set including one or more vector translation instructions.

FIG. 1 is a block diagram of an example embodiment of a processor 100. The processor 100 may be any of various complex instruction set computing (CISC) processors, various reduced instruction set computing (RISC) processors, various very long instruction word (VLIW) processors, various hybrids thereof, or other types of processors entirely. In one or more embodiments, the processor 100 may be a general-purpose processor (e.g., a general-purpose microprocessor of the type manufactured by Intel Corporation, of Santa Clara, Calif.), although this is not required. Alternatively, the instruction processing apparatus may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor 100 has an instruction set architecture (ISA) 101. The instruction set architecture 101 represents the part of the architecture of the processor 100 related to programming. The instruction set architecture 101 commonly includes the native instructions, architectural registers, data types, addressing modes, memory architecture, interrupt and exception handling, and external input and output (I/O) of the processor 100. The instruction set architecture 101 is distinguished from the microarchitecture, which generally represents the particular processor design techniques selected to implement the instruction set architecture. Processors with different microarchitectures may share a common instruction set architecture. For example, certain microprocessors by Intel Corporation, of Santa Clara, Calif., and certain microprocessors of Advanced Micro Devices, Inc. of Sunnyvale, Calif., use substantially different internal microarchitectures to implement similar portions of the x86 instruction set.

The instruction set architecture 101 includes architectural registers (e.g., an architectural register file) 106. The architectural registers 106 can include general purpose registers, and vector registers, scalar floating-point registers, write mask registers, and other registers. Each of the vector registers is operable to store vector, vector data, or SIMD data (e.g. an array of data elements). The architectural registers 106 represent on-board processor storage locations. The architectural registers 106 may also be referred to herein simply as registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

The illustrated instruction set architecture 101 also includes an instruction set 102 that is supported by the processor 100. The instruction set 102 includes several different types of instructions. These instructions of the instruction set 102 represent macroinstructions (e.g., instructions provided to the processor 100 for execution), as opposed to microinstructions or micro-ops (e.g., which result from a decoder 129 of the processor 100 decoding macroinstructions).

The instruction set 102 also includes one or more masked vector instructions 103. The masked vector instructions 103 may be similar to the vector instructions mentioned in the background section with a few notable differences. Similar to the aforementioned vector instructions, each of the masked vector instructions 103 is operable to cause or result in the processor 100 performing a vector operation on data elements of one or more vector operands that are indicated by the instruction. However, each of the masked vector instructions 103 can use one or more masks to mask, predicate, or conditionally control the vector processing. The masks can be stored in the write mask registers (which are part of the architectural registers 106) and can represent mask operands, predicate operands, or conditional operation control operands.

The masks are operable to mask or conditionally control vector processing at per-data element granularity. For example, the masks may be operable to mask whether or not a result of a vector operation of the masked vector instruction 103, performed on individual data elements from a single source vector operand or individual pairs of corresponding data elements from two source vector operands, is to be stored in a vector result. The masked vector instructions 103 may allow vector processing of each data element or pair of corresponding data elements to be predicated or conditionally controlled separately and independently of the data elements. The masked vector instructions 103, operations, and masks may offer certain advantages, such as, for example, increased code density and/or higher instruction throughput.

Referring again to FIG. 1, the instruction set 102 also includes one or more vector translation instructions 104, such as VTRANSLATE_BEGIN 105A and VTRANSLATE_END 105B. VTRANSLATE_BEGIN 105A and VTRANSLATE_END 105B are operable to cause or result in the processor 100 translating vector instructions of a source instruction set to the vector instructions of a target instruction set. In one embodiment, the target instruction set can be executed by the processor 100. In an alternative embodiment, the target instruction set can be executed by another processor different from the processor 100. In some embodiments, VTRANSLATE_BEGIN 105A and VTRANSLATE_END 105B can have the same format as the masked vector instructions 103; however, the VTRANSLATE_BEGIN 105A and VTRANSLATE_END 105B are used as demarcations and some of the fields (e.g., source operands, destination, write mask, etc.) in the masked vector instructions 103 can be left unused (e.g., cleared).

The processor 100 also includes execution logic 109. The execution logic 109 is operable to execute or process the instructions of the instruction set 102. The execution logic 109 may include execution units, functional units, arithmetic logic units, logic units, arithmetic units, etc. The processor 100 also includes a decoder 129 to decode macroinstructions into microinstructions or micro-ops for execution by the execution logic 109.

Figure 2A:
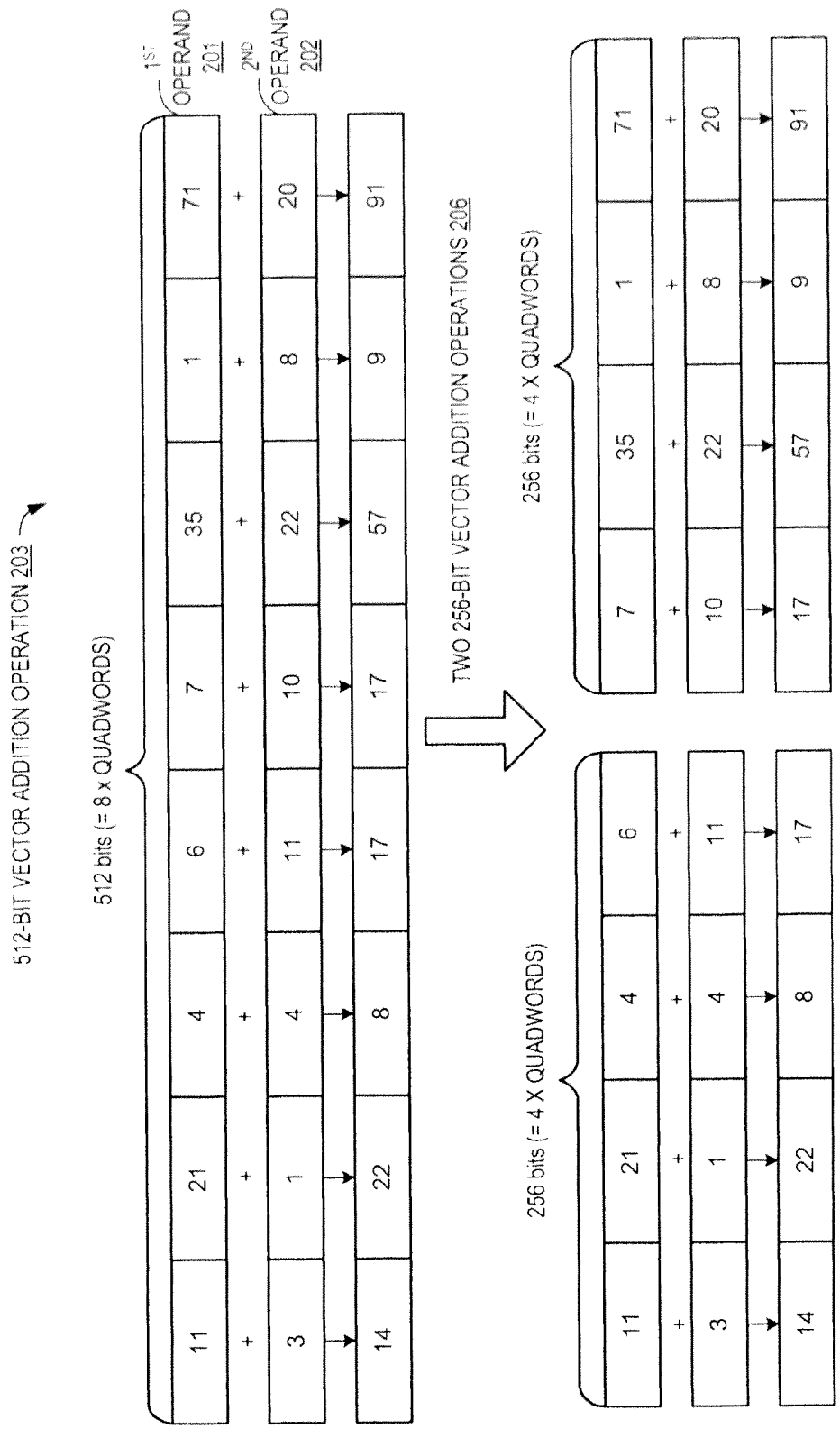
FIGS. 2A-2B illustrate examples of vector translation operations.

To further explain embodiments of the vector translation instructions 104, it may be helpful to consider an example of translating a vector instruction from one vector width to another vector width. FIG. 2A is a block diagram illustrating an example embodiment of a 512-bit vector addition operation 203. The vector addition operation 203 may be performed in response to, or as a result of, a vector instruction such as one of the masked vector instructions 103 of FIG. 1. In this example, the vector addition operation 203 is to add each element of a first 512-bit vector operand 201 to each corresponding element of a second 512-bit vector operand 202. Each element of the first and second operands 201 and 202 is a 64-bit quadword. The result vector is also a 512-bit vector, containing 8 quadwords.

Illustratively, a 512-bit vector addition instruction (which performs the 512-hit vector addition operation 203) can be translated to two 256-bit vector addition instructions (each performing a 256-bit vector addition operation 206). This can be useful when the target processor on which the translated vector instructions are being executed has 256-bit wide vector registers instead of 512-bit wide vector registers. Each of the 256-bit vector addition operations 206 operates on a different half of the elements in the first and the second operands 201 and 202. The result vectors of operations 206, when combined, have the same data element values as the result vector of the operation 203 in the corresponding data element positions.

It is noted that the translation can also be performed in the reverse direction. For example, two 256-bit vector addition instructions can be translated to one 512-bit vector addition instruction to allow vector operations to be performed efficiently on a target processor having 512-bit wide vector registers.

In the example of FIG. 2A, the translation is performed when the vector addition instruction is used with a cleared mask (i.e., all of the mask bits are cleared, which is equivalent to unmasking or no mask). The translation can also be performed when the vector addition instruction is used with a set mask (i.e., at least one of the mask bits is set).

Figure 2B:
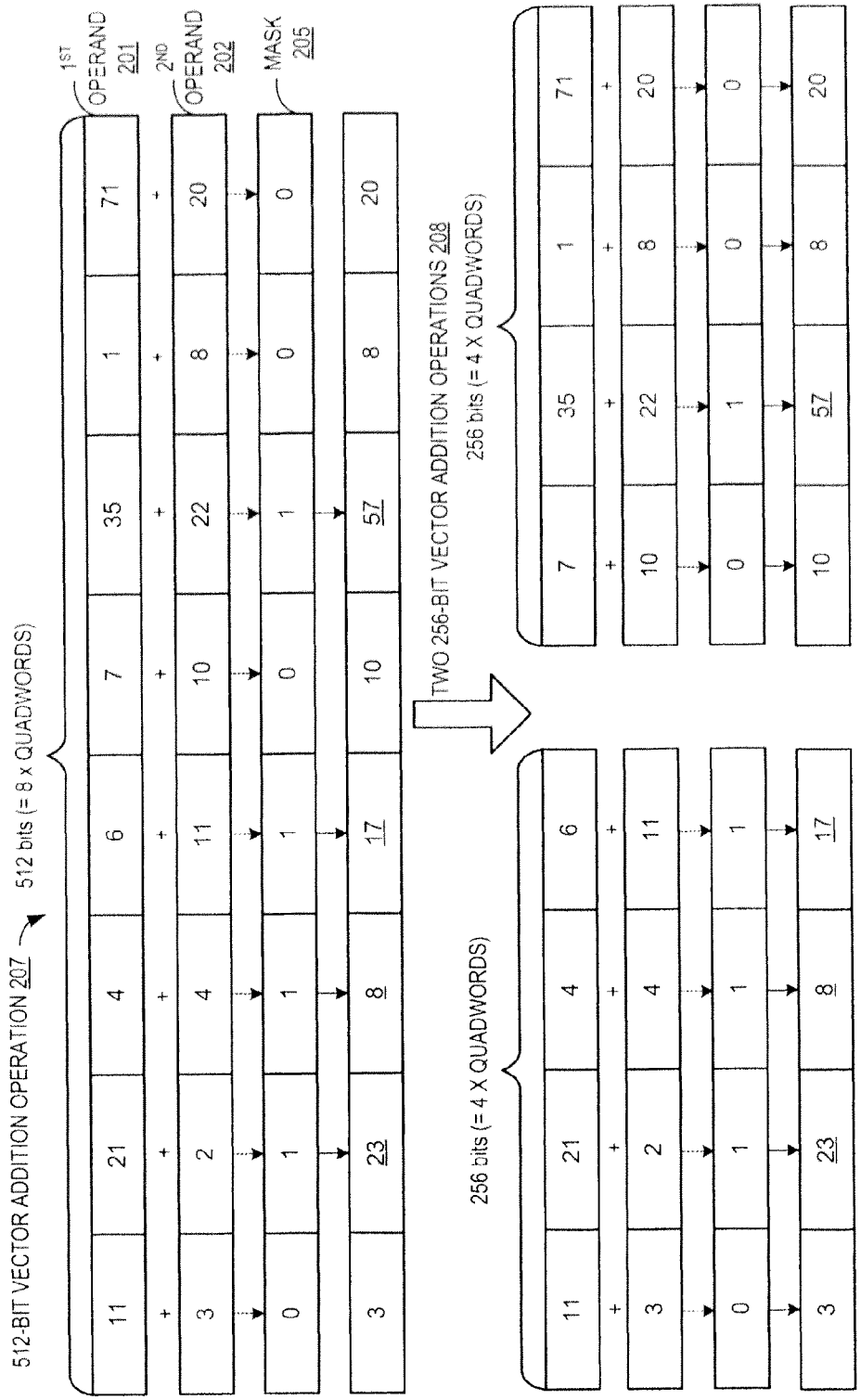

In the example of FIG. 2B, a 512-bit vector addition instruction uses a mask 205 "01110100" to perform a 512-bit vector addition operation 207. As an example, the mask 205 may be specified in a write mask field of the 512-bit vector addition instruction. Each of the mask bits corresponds to a data element of the first and second operands 201 and 202 in the corresponding data element positions. Each mask bit allows specifying either of two different possibilities (e.g., perform the operation versus do not perform the operation, store a result of the operation versus do not store a result of the operation, etc.). In this example, the mask 205 contains 8 bits. Each mask bit has an ordered correspondence to one of the 8 data elements of the operand 201 and one of the 8 data elements of the operand 202. The 512-bit vector addition instruction (as well as the mask 205) can be translated into two 256-bit vector addition instructions, each performing a 256-bit vector addition operation 208 with a corresponding half of the mask bits.

According to the illustrated example, the vector addition operation 207 is a masked vector operation that is operable to conditionally store sums of pairs of corresponding data elements from the first and second operands 201 and 202 in a result vector in accordance with the conditional operation control or predication provided by the corresponding bits of the mask 205. This vector addition operation 207 specifies that a single operation (in this case addition) is to be conditionally performed in a vertical fashion on each pair of corresponding data elements separately or independently of the other pairs. The result vector is of the same size as the source operands and has the same number of data elements as the source operands. Each of the eight bits of the mask 205 is either set (i.e., has a binary value of 1) or is cleared (i.e., has a binary value of 0). According to the illustrated convention, when a mask bit is set (e.g., 1), the addition of the corresponding data elements of the first and second operands are performed, and the sum (shown as underlined) is stored in a corresponding data element of the result vector. Conversely, when the given mask bit is cleared (i.e., 0), a result of the addition is not allowed to be stored in the corresponding data element of the result vector, or the addition is not performed on the corresponding data elements of the first and second operands. Rather, another value may be stored in the corresponding data element of the result vector. For example, as shown in the illustration, the value of the corresponding data element from the second operand 202 may be stored in the corresponding data element of the result vector. This is referred to as merging-masking. Alternatively, a zero value may be stored in the corresponding data element of the result vector. This is referred to as zero-masking. An opposite convention to that illustrated is also possible where bits are cleared (i.e., 0) to allow the results to be stored, or set (i.e., 1) to not allow the results to be stored.

In some embodiments, a mask can include multiple mask elements (also referred to as predicate elements, conditional control elements, or flags), with each mask element having more than one bit. Having two or more bits for each mask element can be useful if selecting between more than two different options is desired.

As another example of instruction translation, the 512-bit vector addition instruction of FIG. 2B may be translated to a sequence of scalar addition instructions for execution by a target processor that does not support the use of masks (e.g., the mask 205). Conversely, a sequence of scalar addition instructions from the instruction set of one processor can be translated into a masked vector additional instruction for execution by another processor that supports masked vector instructions.

As yet another example of instruction translation, a processor may support an instruction set that includes a vector multiple-and-add instruction as a single instruction. The vector multiple-and-add instruction, when executed by the processor, multiplies a first vector operand with a vector second operand, and adds the result to a third vector operand. In another instruction set, the vector multiple-and-add operation may need to be carried out by two separate instructions: a vector multiplication instruction and a vector addition instruction. The vector translation instructions 104 (FIG. 1) described herein can translate the vector multiple-and-add instruction of one instruction set into a vector multiplication operation and a vector addition operation of another instruction set, and vice versa.

FIGS. 3A-3C illustrate an example of using the vector translation instructions 104 shown in FIG. 1. In the two alternative embodiments of FIGS. 3A and 3B, the vector translation instructions 104, including VTRANSLATE_BEGIN 105A and VTRANSLATE_END 105B, are used as demarcations before and after a code region to be translated, respectively. The code region can contain a sequence of instructions. Some or all of the instructions to be translated can be within one or more functions. The instructions to be translated can include vector instructions and/or scalar instructions supported by a source processor but not a target processor (on which the translated instructions are to be executed). Additionally, the instructions to be translated can include one or more new vector instructions, which are not supported by the underlying physical hardware (e.g., decoder) of the source processor and the target processor.

For example, the code region to be translated can include a new vector instruction, such as VGATHER, that is not supported by the source processor and the target processor. The VGATHER instruction can be translated into a sequence of load instructions for execution by the target processor, as shown in FIG. 3C after the code region is translated. The ability of adding new instructions provides a powerful tool for the programmers without the hardware designers having to redesign the hardware to support these new instructions.

In some embodiments, the VTRANSLATE_BEGIN 105A and VTRANSLATE_END 105B are used by a programmer (or a source code generator) to demarcate a code region containing vector instructions that are upgraded or otherwise updated from one processor generation to the next processor generation. These generations of processors may share a common set of basic instructions. However, each processor generation may support a more advanced, or otherwise different, set of vector instructions. By translating these vector instructions automatically across different instruction sets, a programmer only needs to write a set of vector instructions once.

To allow the translation to be performed correctly and efficiently, in one embodiment, the programmer (or the source code generator) needs to ensure the following conditions:

1. The demarcated code (that is, the code to be translated) does not contain self-modifying and cross-modifying code. That is, the demarcated code will not be modified by any other code in the same program.

2. The demarcated code does not contain any cross-thread communication, including synchronization primitives.

3. A functional requirement of the translated code (that is, the result of the translation) is to produce the same memory output at the VTRANSLATE_END 105B instruction. For example, if the demarcated code produces value V at memory address X at the VTRANSLATE_END 105B instruction, the translated code also has to produce value V at memory address X.

4. During execution of the translated code, the translated code is allowed to push temporary values onto the program stack, and pop temporary values from the program stack. That is, all of the memory addresses that are not used by the program (in which the translated code resides) are readable and writable.

5. Any vector register V read by the code within the demarcated code region must be written to (initialized) in the demarcated code region before V is read. Any register W written within the demarcated code region has an undefined value after executing VTRANSLATE_END. That is, all inputs to the demarcated code are read from memory (or a scalar register file) and all outputs are produced in memory (or scalar register file). This allows the translated code to utilize vector register for storing temporary values.

FIG. 4 is a block diagram of an example embodiment of an instruction processing apparatus 415 having an execution unit 440 that is operable to execute instructions including an example embodiment of the vector translation instructions 104 of FIG. 1. In some embodiments, the instruction processing apparatus 415 may be a processor and/or may be included in a processor (e.g., the processor 100 of FIG. 1, or one similar). Alternatively, the instruction processing apparatus 415 may be included in a different processor, or electronic system.

The instruction processing apparatus 415 receives a code region including multiple instructions demarcated by the vector translation instructions 104 of FIG. 1. These multiple instructions are referred to as demarcated instructions or demarcated code region. The demarcated instructions may be received from memory, an instruction queue, an instruction fetch unit, or another source. The demarcated instructions include one or more vector instructions; some or all of which can be the masked vector instructions 103 shown in FIG. 1. The demarcated instructions are processed by a translation logic 418, which can be invoked at compile time, install time, load time, or runtime. The translation logic 418 can be invoked by any of the following: a compiler, an installer, a loader and a runtime interpreter (e.g., a process virtual machine such as a JAVA virtual machine). When invoked, the translation logic 418 analyzes the demarcated instructions and calls a translation library 420 to perform the translation. The translation library 420 can be stored in a memory 413 coupled to the translation logic 418. The translation library 420 can be a binary code library. The translation library 420 can be shared by compilers, installers, loaders and runtime interpreters.

In one embodiment, the translation library 420 can be called by a compiler at compile time, an installer at install time, a loader at load time, and/or an interpreter or the program (that contains the demarcated instructions) itself at runtime. For example, a compiler can compile a program written in a high-level programming language into an intermediate form in binary code. If the intermediate binary code contains demarcated instructions, the compiler can further compile the demarcated instructions into translated instructions with the use of the translation library 420 at compile time. The translated instructions are supported by the instruction set of a target processor on which the translate instructions are executed. As another example, an installer can install an application in binary code onto a target processor on which the application is to run. If the installed application contains demarcated instructions, the installer can call the translation library 420 to translate them into translated instructions during install time. Similarly, a loader can load binary code into the memory of a target processor on which the code is to run. If the loaded code contains demarcated instructions, the loader can call the translation library 420 to translate them into translated instructions during load time. A runtime interpreter can interpret binary code for execution by a target processor at runtime. If the interpreted code contains demarcated instructions, the interpreter can call the translation library 420 to translate them into translated instructions during runtime.

The illustrated embodiment of the instruction processing apparatus 415 includes a decoder 430, which can be the decoder 129 of FIG. 1 or one similar. The decoder 430 receives the translated instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 430 may be implemented using various different mechanisms. Examples of suitable mechanisms include, but are not limited to, microcode random access memories (ROMs), look-up tables, hardware implementations, programmable logic arrays (PLAs), other mechanisms used to implement decoders known in the art, etc.

The instruction processing apparatus 415 also includes the execution unit 440 coupled with the decoder 430. The execution unit 440 may receive from the decoder 430 one or more micro-operations, micro-code entry points, microinstructions, other instructions, or other control signals, which reflect, or are derived from the instructions demarcated by the vector translation instructions 140 of FIG. 1.

When the execution unit 440 executes the translated code, it receives input from memory 450 and/or a scalar register file 460. The scalar register file 460 may be part of the architectural register 106 of FIG. 1. Output from the execution unit 440 executing the translated code is stored at the memory 450 and/or the scalar register file 460. During execution, the execution unit 440 can use a portion of the memory 450, a vector register file 470, and/or the scalar register file 460 (as long as the original values in the scalar register file 460 are preserved) to push and pop temporary values. In FIG. 4, the dotted lines associated with the temporary values indicate that the use of the memory 450, the vector register file 470, and/or the scalar register file 460 for temporary values is optional and not required. As used herein, the term input and output are distinguished from "temporary values." A temporary value is an intermediate result that is stored into and accessed from a stack during the execution of the translated code. An input refers to the values read from a location at the beginning of the translated code (that is, at the VTRANSLATE_BEGIN 105A), and an output refers to the values read from a location at the beginning of the translated code (that is, at the VTRANSLATE_END 105B). As described above as one of the conditions for demarcating a code region, the vector register file 460 cannot be used to store input and output, but can be used to store temporary values.

To avoid obscuring the description, a relatively simple instruction processing apparatus 415 has been shown and described. It is to be appreciated that other embodiments may have more than one execution unit. For example, the apparatus may include multiple different types of execution units, such as, for example, arithmetic units, arithmetic logic units (ALUs), integer units, floating point units, etc. At least one of these units may be responsive to an embodiment of a vector translation instruction as disclosed herein. Still other embodiments of instruction processing apparatus or processors may have multiple cores, logical processors, or execution engines. An execution unit operable to execute one or more vector translation instructions may be included within at least one, at least two, most, or all of the cores, logical processors, or execution engines.

The instruction processing apparatus 415 or processor may also optionally include one or more other well-known components. For example, other embodiments may include one or more of instruction fetch logic, scheduling logic, branch prediction logic, instruction and data caches, instruction and data translation lookaside buffers, prefetch buffers, microinstruction queues, microinstruction sequencers, bus interface units, second or higher level caches, instruction scheduling logic, retirement logic, register renaming logic, and the like, and various combinations thereof. It is to be appreciated that there are literally numerous different combinations and configurations of such components in processors, and that the scope of the invention is not limited to any known such combination or configuration.

FIG. 5 is a block diagram of an article of manufacture (e.g., a computer program product) including a tangible, non-transitory machine-readable (e.g., machine-accessible) storage medium 500 that stores vector translation instructions 510, such as VTRANSLATE_BEGIN 105A and VTRANSLATE_END 105B shown in FIG. 1. The storage medium 500 also stores vector instructions 520, which can include one or more masked vector instructions 103 shown in FIG. 1. It is to be appreciated that other instructions or sequences of instructions to perform one or more operations or methods described herein (e.g., a compiler, an installer, a loader, a runtime interpreter, a translation library, etc.) may also be stored on the storage medium 500.

In various embodiments, the tangible non-transitory machine-readable storage medium 500 may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more tangible solid materials, such as, for example, a semiconductor material, a phase-change material, a magnetic material, an optically transparent solid material of an optical disc, etc.

Examples of suitable machines include, but are not limited to, instruction processing devices, instruction execution devices, processors, and various electronic devices having one or more instruction processing devices, instruction execution devices, or processors. A few representative examples of such electronic devices include, but are not limited to, computer systems, desktops, laptops, notebooks, servers, network devices, routers, switches, netbooks, nettops, Mobile Internet devices (MIDs), cellular phones, and media players. Such electronic devices typically include one or more processors coupled with one or more other components, such as, for example, one or more tangible non-transitory machine-readable storage mediums. The coupling of the processors and other components is typically through one or more busses and bridges (also termed bus controllers). Thus, the storage device or storage mediums of an electronic device may store instructions and/or instruction sequences for execution on the one or more processors of that electronic device.

FIG. 6 is a flow diagram of an example embodiment of a method 600 of processing an example embodiment of vector translation instructions (such as the vector translation instructions 104 of FIG. 1). In various embodiments, the method 600 may be performed by a general-purpose processor, a special-purpose processor (e.g., a graphics processor or a digital signal processor), or another type of digital logic device or instruction processing apparatus. In some embodiments, the method 600 may be performed by the processor 100 of FIG. 1, or the instruction processing apparatus 415 of FIG. 4, or a similar processor or instruction processing apparatus. Alternatively, the method 600 may be performed by different embodiments of processors or instruction processing apparatus. Moreover, the processor 100 of FIG. 1, and the instruction processing apparatus 415 of FIG. 4, may perform embodiments of operations and methods either the same as, similar to, or different than those of the method 600 of FIG. 6.

The method 600 includes a processor receiving a code region and a pair of vector translation instructions, such as VTRANSLATE_BEGIN 105A and VTRANSLATE_END 105B shown in FIG. 1 (block 610). The processor can be a source processor or a target processor. The vector translation instructions demarcate the beginning and the end of the code region. The code region includes a first set of vector instructions defined in an instruction set of the source processor. The processor translates the code region into translated code (block 620). The translated code includes a second set of vector instructions defined in an instruction set of the target processor. The translated code is executed by the target processor to produce a result value (block 630), the result value being the same as an original result value produced by the source processor executing the code region. The target processor stores the result value at a location that is not a vector register (block 640), the location being the same as an original location used by the source processor to store the original result value. The location can be a memory address or a scalar register.

Embodiments of the invention provide a simple, lightweight approach for translating vector code. Vector code can be translated with low or no overhead. The translation can be performed at compile time, install time, load time, or runtime. Embodiments of the invention also allow a programmer to write a piece of vector code only once for one instruction set architecture, and to have the vector code executed by multiple processors that have multiple different instruction set architectures. Thus, a programmer does not need to re-write a program when the program is ported to run on new instruction set architecture that has a wider vector size and/or supporting more complex vector instructions. A programmer also does not need to re-write a program when the program is ported to run on earlier-generation processors that have a smaller vector size and/or not supporting certain vector instructions in the program. Additionally, embodiments of the invention allow new instructions and functionalities to be used by a programmer without having the underlying hardware actually decoding and executing the new instructions. This provides a programmer a tool to write programs using powerful instructions without any change to the physical hardware.

Exemplary Computer Systems and Processors—FIGS. 7-11

FIGS. 7-11 are exemplary computer systems and processors. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
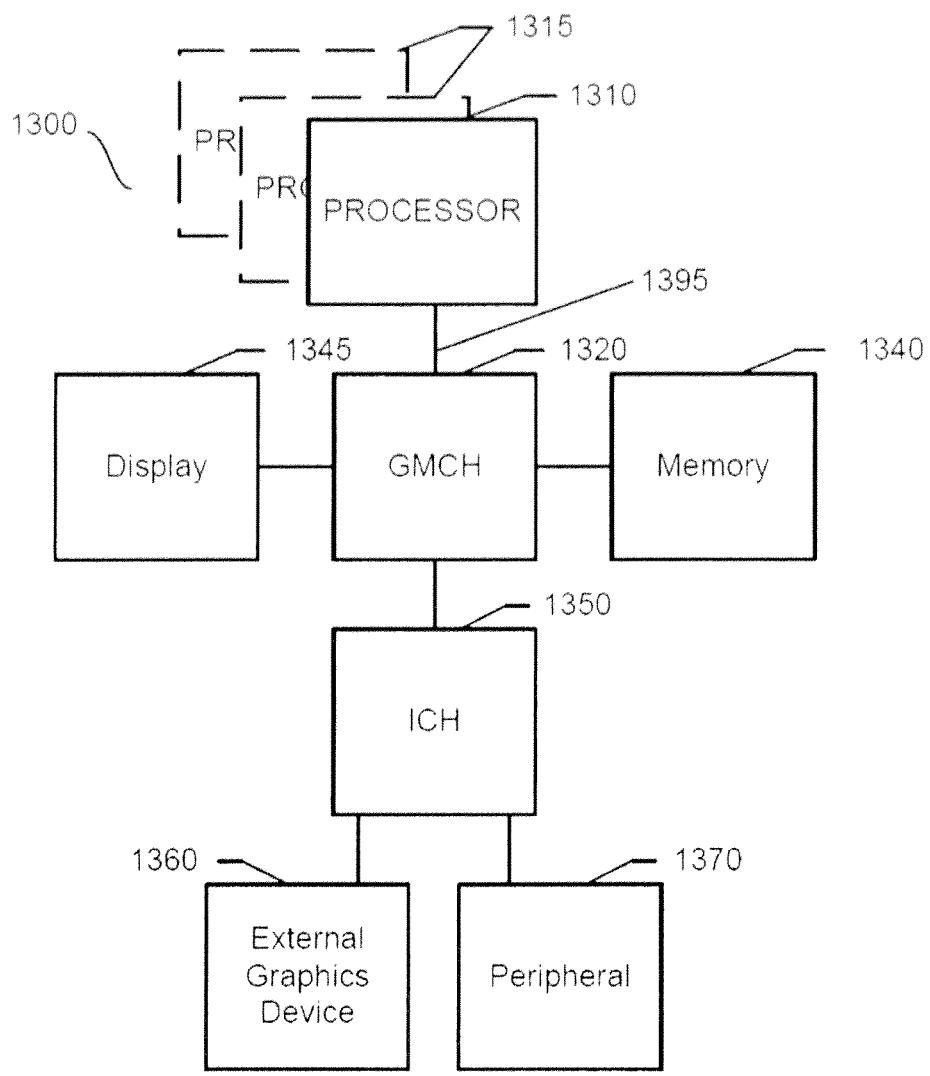
FIG. 7 is a block diagram of a system in accordance with one embodiment of the invention.

Referring now to FIG. 7, shown is a block diagram of a system 1300 in accordance with one embodiment of the invention. The system 1300 may include one or more processors 1310, 1315, which are coupled to graphics memory controller hub (GMCH) 1320. The optional nature of additional processors 1315 is denoted in FIG. 7 with broken lines.

Each processor 1310, 1315 may be some version of processor 1700. However, it should be noted that it is unlikely that integrated graphics logic and integrated memory control units would exist in the processors 1310, 1315.

FIG. 7 illustrates that the GMCH 1320 may be coupled to a memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 7 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, micro-architectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 8:
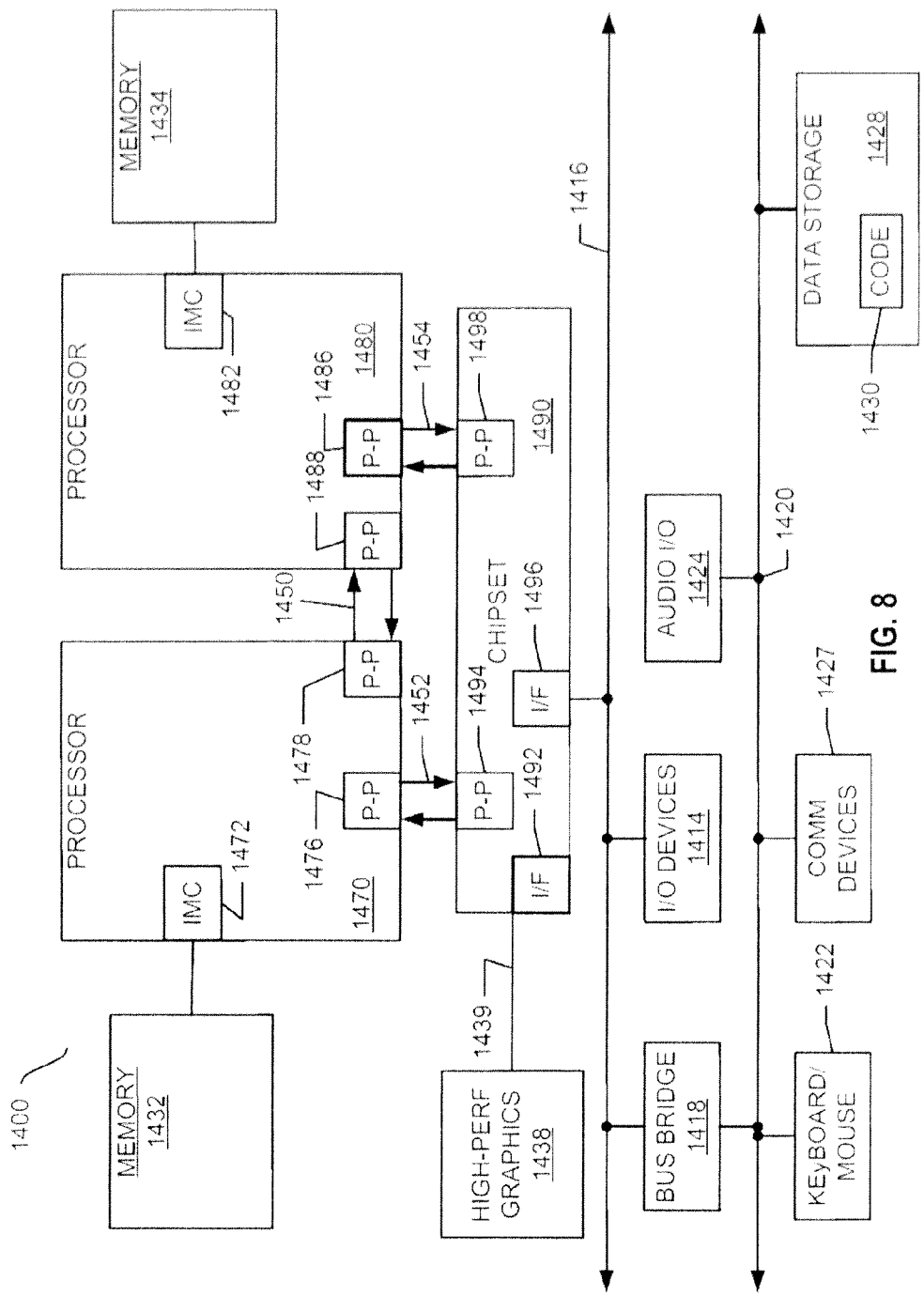
FIG. 8 is a block diagram of a second system in accordance with an embodiment of the invention.

Referring now to FIG. 8, shown is a block diagram of a second system 1400 in accordance with an embodiment of the present invention. As shown in FIG. 8, multiprocessor system 1400 is a point-to-point interconnect system, and includes a first processor 1470 and a second processor 1480 coupled via a point-to-point interconnect 1450. As shown in FIG. 8, each of processors 1470 and 1480 may be some version of the processor 1700.

Alternatively, one or more of processors 1470, 1480 may be an element other than a processor, such as an accelerator or a field programmable gate array.

While shown with only two processors 1470, 1480, it is to be understood that the scope of the present invention is not so limited. In other embodiments, one or more additional processing elements may be present in a given processor.

Processor 1470 may further include an integrated memory controller hub (IMC) 1472 and point-to-point (P-P) interfaces 1476 and 1478. Similarly, second processor 1480 may include a IMC 1482 and P-P interfaces 1486 and 1488. Processors 1470, 1480 may exchange data via a point-to-point (PtP) interface 1450 using PtP interface circuits 1478, 1488. As shown in FIG. 8, IMC's 1472 and 1482 couple the processors to respective memories, namely a memory 1442 and a memory 1444, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1439.

A shared cache (not shown) may be included in either processor outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 8, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the pointto-point architecture of FIG. 8, a system may implement a multi-drop bus or other such architecture.

Figure 9:
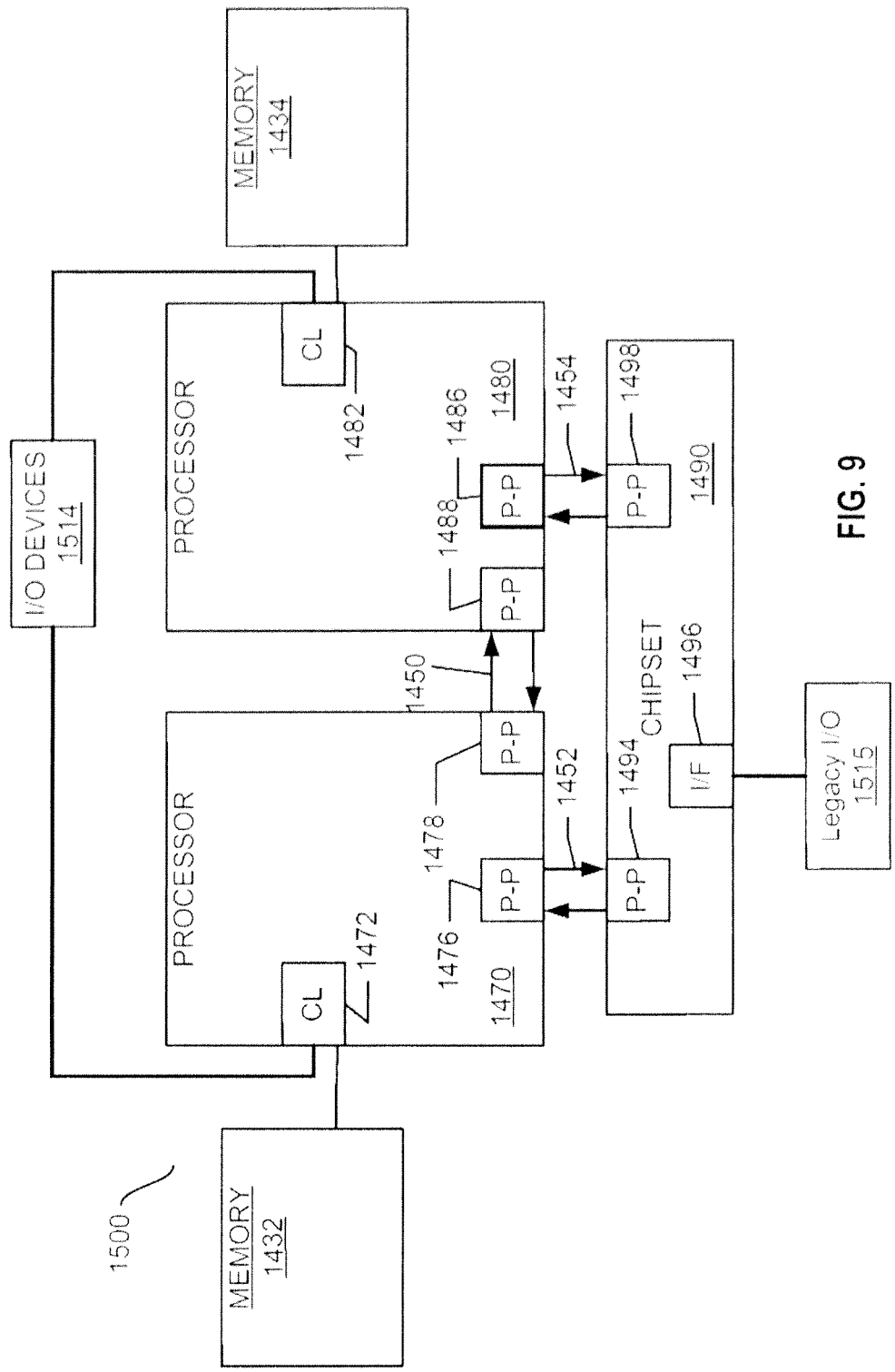
FIG. 9 is a block diagram of a third system in accordance with an embodiment of the invention.

Referring now to FIG. 9, shown is a block diagram of a third system 1500 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIGS. 89 and 14. In addition. CL 1472, 1482 may also include I/O control logic. FIG. 15 illustrates that not only are the memories 1442, 1444 coupled to the CL 1472, 1482, but also that I/O devices 1514 are also coupled to the control logic 1472, 1482. Legacy I/O devices 1515 are coupled to the chipset 1490.

Figure 10:
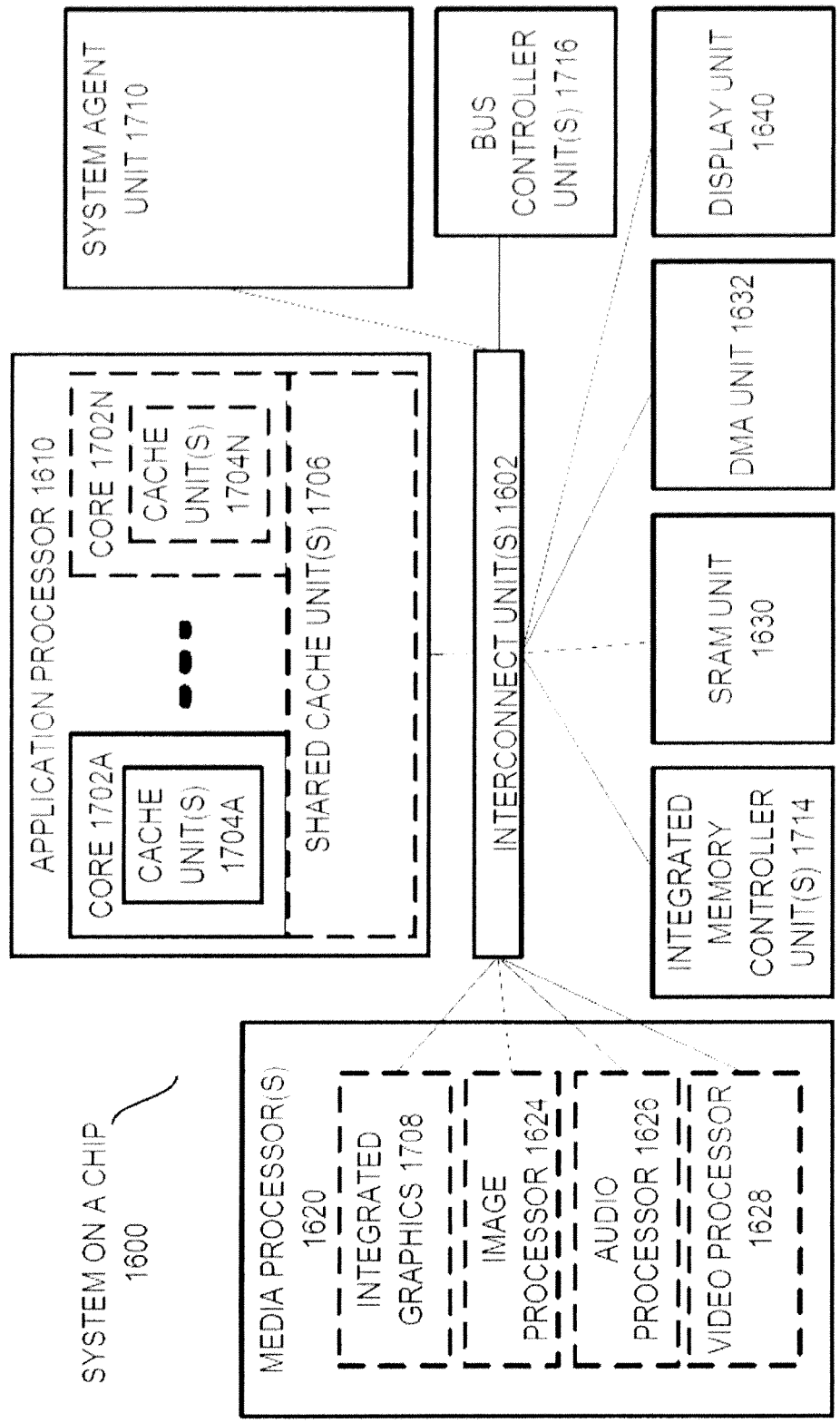
FIG. 10 is a block diagram of a system-on-a-chip (SoC) in accordance with an embodiment of the invention.
Figure 11:
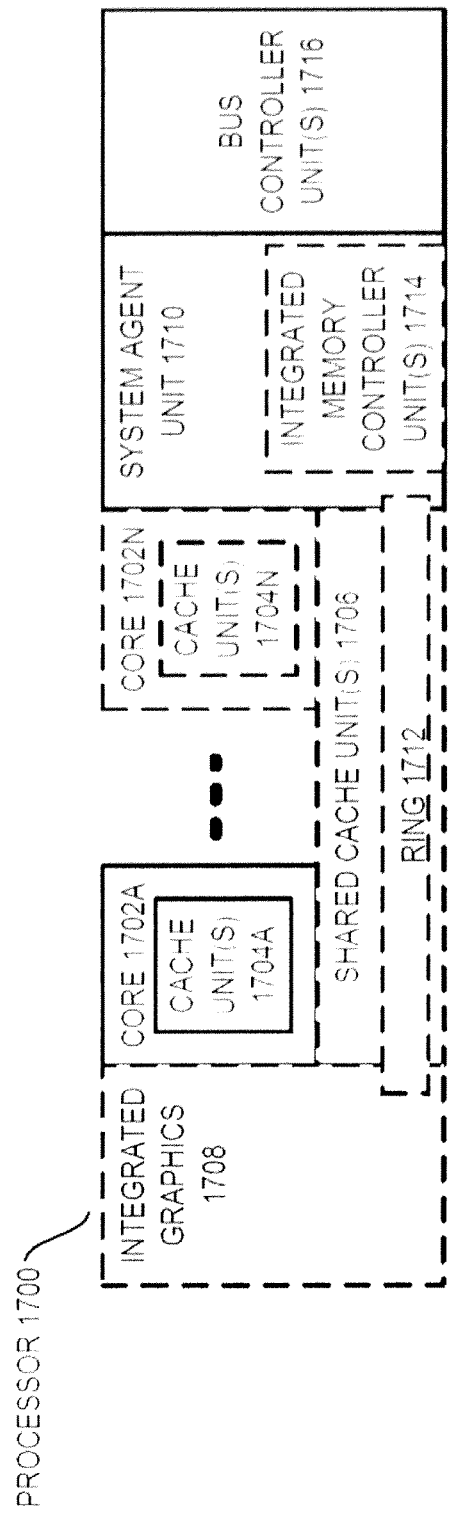
FIG. 11 is a block diagram of a single core processor and a multicore processor with integrated memory controller and graphics according to embodiments of the invention.

Referring now to FIG. 10, shown is a block diagram of a SoC 1600 in accordance with an embodiment of the present invention. Similar elements in FIG. 11 bear like reference numerals. Also, dashed lined boxes are optional features on more advanced SoCs. In FIG. 10, an interconnect unit(s) 1602 is coupled to: an application processor 1610 which includes a set of one or more cores 1702A-N and shared cache unit(s) 1706; a system agent unit 1710; a bus controller unit(s) 1716; an integrated memory controller unit(s) 1714; a set or one or more media processors 1620 which may include integrated graphics logic 1708, an image processor 1624 for providing still and/or video camera functionality, an audio processor 1626 for providing hardware audio acceleration, and a video processor 1628 for providing video encode/decode acceleration; an static random access memory (SRAM) unit 1630; a direct memory access (DMA) unit 1632; and a display unit 1640 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions the vector friendly instruction format or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
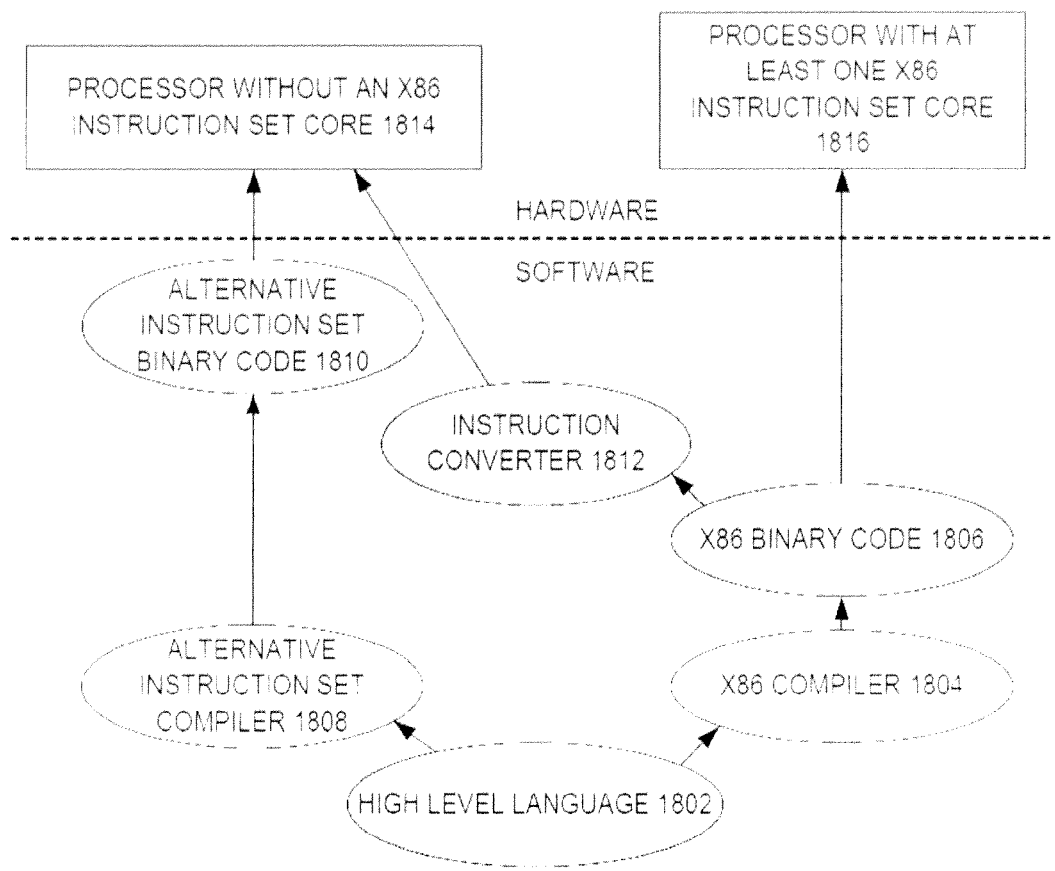
FIG. 12 is a block diagram contrasting the use of a software instruction converter to convert binary instructions in a source instruction set to binary instructions in a target instruction set according to embodiments of the invention.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1802 may be compiled using an x86 compiler 1804 to generate x86 binary code 1806 that may be natively executed by a processor with at least one x86 instruction set core 1816 (it is assume that some of the instructions that were compiled are in the vector friendly instruction format). The processor with at least one x86 instruction set core 1816 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 12 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Certain operations of the instruction(s) in the vector friendly instruction format disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 7-11 and embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving a code region and a pair of vector translation instructions demarcating a beginning and an end of the code region, the code region including a first set of vector instructions defined in an instruction set of a source processor;
    translating the code region into translated code, the translated code including a second set of vector instructions defined in an instruction set of a target processor:
    executing the translated code by the target processor to produce a result value, the result value being the same as an original result value produced by the source processor executing the code region; and
    storing the result value at a location that is not a vector register, the location being the same as an original location used by the source processor to store the original result value.

2. The method of claim 1, wherein the code region does not contain self-modifying code and cannot be modified by code outside of the code region.

3. The method of claim 1, wherein the code region does not contain cross-thread communication.

4. The method of claim 1, wherein the first set of vector instructions specify a vector width different from the vector width specified by the second set of vector instructions.

5. The method of claim 1, wherein the target processor executing the translated code does not receive input to the translated code from any vector registers of the target processor and does not store final output generated by the translated code into any of the vector registers, the method further comprising:
    storing temporary values in the vector registers during execution of the translated code.

6. The method of claim 1, wherein translating the code region further comprises:
    translating the code region using a translation library, the translation library being shared by a compiler, an installer, a loader and a runtime interpreter that run on the target processor and are capable of invoking the translation of the code region.

7. The method of claim 1, wherein the code region further includes a third set of vector instructions that are not defined in the instruction set of the source processor, wherein translating the code region further comprises:
    translating the third set of vector instructions into instructions that are defined in the instruction set of the target processor.

8. An apparatus comprising:
translating logic to receive a code region and a pair of vector translation instructions that demarcate a beginning and an end of the code region, and to translate the code region into translated code, wherein the code region includes a first set of vector instructions defined in an instruction set of a source processor, and the translated code includes a second set of vector instructions defined in an instruction set of a target processor;
decoding logic coupled to the translating logic to decode the translated code;
execution logic coupled to the decoding logic to execute the translated code to produce a result value, and to store the result value at a location that is not a vector register, wherein the result value is the same as an original result value produced by the source processor executing the code region, and the location is the same as an original location used by the source processor to store the original result value.

9. The apparatus of claim 8, wherein the first set of vector instructions specify a vector width different from the vector width specified by the second set of vector instructions.

10. The apparatus of claim 8, further comprising:
a plurality of vector registers, which store temporary values during execution of the translated code, wherein the plurality of vector registers do not store input to the translated code and do not store final output generated by the translated code.

11. The apparatus of claim 8, further comprising:
memory to store a translation library, which is used by the translation logic to translate the code region, the translation library shared by a compiler, an installer, a loader and a runtime interpreter that run on the target processor and are capable of invoking the translation logic.

12. A system comprising:
an interconnect;
a processor coupled to the interconnect, the processor including:
translating logic to receive a code region and a pair of vector translation instructions that demarcate a beginning and an end of the code region, and to translate the code region into translated code, wherein the code region includes a first set of vector instructions defined in an instruction set of a source processor, and the translated code includes a second set of vector instructions defined in an instruction set of a target processor;
decoding logic coupled to the translating logic to decode the translated code;
execution logic coupled to the decoding logic to execute the translated code to produce a result value, and to store the result value at a location that is not a vector register, wherein the result value is the same as an original result value produced by the source processor executing the code region, and the location is the same as an original location used by the source processor to store the original result value; and
a dynamic random access memory (DRAM) coupled to the interconnect.

13. The system of claim 12, further comprising:
memory to store a translation library, which is used by the translation logic to translate the code region, the translation library shared by a compiler, an installer, a loader and a runtime interpreter that run on the target processor and are capable of invoking the translation logic.

14. The system of claim 12, wherein the code region does not contain self-modifying code and cannot be modified by code outside of the code region.

15. The system of claim 12, wherein the code region does not contain cross-thread communication.

16. The system of claim 12, wherein the first set of vector instructions specify a vector width different from the vector width specified by the second set of vector instructions.

17. The system of claim 12, wherein the target processor executing the translated code does not receive input to the translated code from any vector registers of the target processor and does not store final output generated by the translated code into any of the vector registers, wherein the target processor is to store temporary values in the vector registers during execution of the translated code.

18. The system of claim 12, wherein the code region further includes a third set of vector instructions that are not defined in the instruction set of the source processor, and wherein the translating logic is to translate the third set of vector instructions into instructions that are defined in the instruction set of the target processor.

* * * * *